No. 868,080. PATENTED OCT. 15, 1907.
W. H. FEATHERSTONE.
FIRE HYDRANT.
APPLICATION FILED NOV. 5, 1906.

Witnesses

Inventor
William Henry Featherstone
By H. B. Willson & Co.
Attorneys

UNITED STATES PATENT OFFICE.

WILLIAM HENRY FEATHERSTONE, OF CHATHAM, ENGLAND.

FIRE-HYDRANT.

No. 868,080.  Specification of Letters Patent.  Patented Oct. 15, 1907.

Application filed November 5, 1906. Serial No. 342,129.

*To all whom it may concern:*

Be it known that I, WILLIAM HENRY FEATHERSTONE, a subject of the King of Great Britain and Ireland, and residing at 26 Nelson road, Chatham, in the county of Kent, England, have invented certain new and useful Improvements in and Relating to Fire-Hydrants, of which the following is a specification.

This invention relates to fire hydrants of the k nd wherein the main valve to which the hose is connected is adapted to be automatically operated by the simple grasping of the branch pipe or nozzle and removal of the same such as would occur if any one on hearing an alarm of fire were to grasp the branch pipe or nozzle, remove it, and run with it to the spot required. In such arrangements as have hitherto been proposed a special valve and fitting is necessary. The valve has been of such a nature that it has been quite useless for any other purpose than that of a hydrant.

The object of the present invention is to enable an automatic hydrant of the kind referred to to be combined with an ordinary bib-cock or other valve capable of supplying water for use in the ordinary way so that one single fitting can be employed for both purposes.

Figure 1:
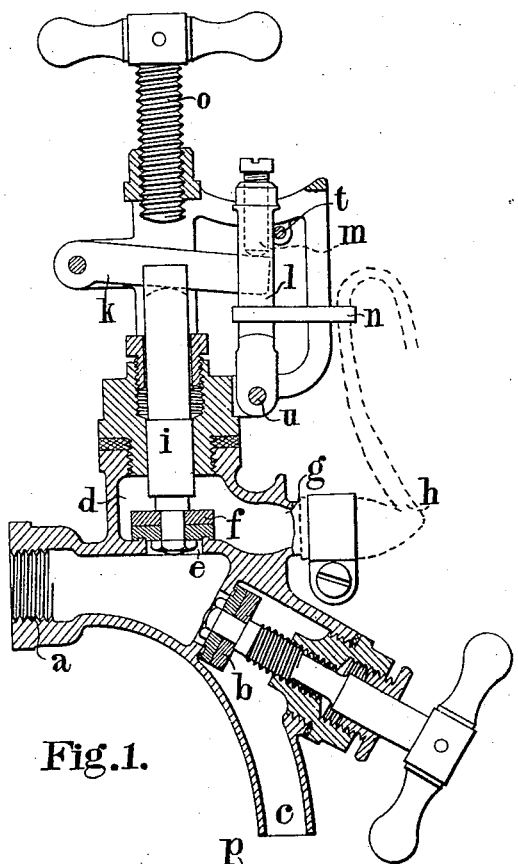
Figure 2:
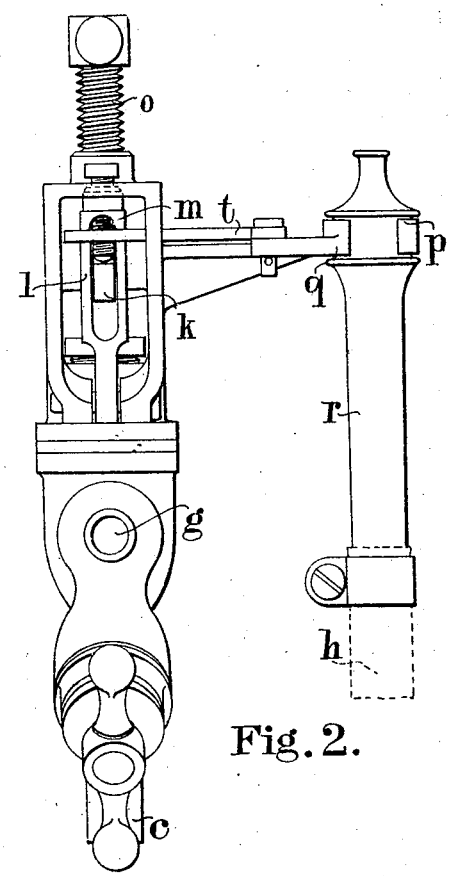
Figure 3:
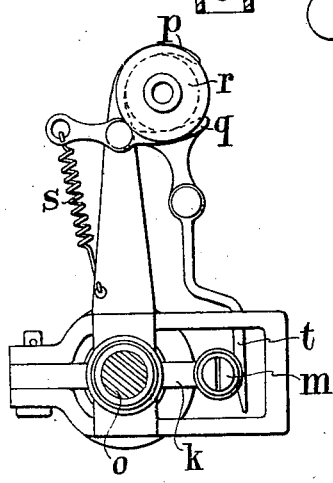

In the accompanying drawings, Figure 1 is a side sectional elevation of a combined bib-cock and automatic hydrant according to one form of he invention. Fig. 2 being a front elevation corresponding thereto, Fig. 3 is a sectional plan.

In carrying out the invention according to one mode, a bib-cock provided with the ordinary connection, $a$, and outlet branch, $c$, controlled by a screw down or other valve, $b$, is provided with an additional branch, $d$, the communicating passage, $e$, of which is controlled by a valve, $f$. An outlet branch, $g$, from the branch, $d$, is adapted to receive a hose, $h$. The valve, $f$, is normally kept closed by means hereinafter described, whereas the valve, $b$, is free to be used for controlling the supply of water through the outlet branch, $c$, for any usual purpose. The valve spindle, $i$, of the valve, $f$, is maintained in a closed down position by a lever, $k$, which is held in turn by a screw, $m$, carried by a link, $l$, pivoted at $u$, to the valve casing. So long as the link, $l$, is in a vertical position the valve spindle, $i$, is held down irrespective of the pressure below the valve $f$. The valve, $f$, may be positively held down if desired for any special purpose by means of a screw $o$, which can be thrust down upon the lever, $k$, but normally the screw, $o$, is in the raised condition and is only employed to close the valve, $f$, while the apparatus is being adjusted initially or set ready for use. In order to permit automatic release of the valve, $f$, the hose, $h$, which may be wound upon any usual reel, is connected to the link, $l$, by a loop of leather, $n$, or by any other means. Thus when the hose is pulled it causes the link, $l$, to move about its pivot, $u$, and bring its screw, $m$, off the lever, $k$, whereupon the pressure below the valve, $f$, opens the latter and allows water to flow from the branch, $a$, to the branch, $g$, and thence to the hose, $h$. It is preferred, however, to temporarily lock the link, $l$, by means of a rod, $t$, which is carried by the movable jaw, $q$, of a pair of jaws, $p$ and $q$, adapted to hold the branch or nozzle, $r$, a spring, $s$, being attached to an extension of the jaw, $q$, so that immediately the branch or nozzle, $r$, is withdrawn the spring, $s$, in closing the jaw, $q$, withdraws the locking rod, $t$, to release the link, $l$.

In use a person hearing an alarm of fire simply has to run to the hydrant, grasp the nozzle, $r$, and run away with it to the spot required, whereupon the locking rod, $t$, releases the link, $l$, and the latter in turn is pulled by the hose and releases the lever, $k$, so that the valve, $f$, can rise under the pressure of the water and a sufficient supply of water is automatically obtained.

It will be understood that irrespective of the hydrant being always ready for use the bib-cock is continually ready for the supply of water for any usual purpose, so that both a hydrant and an ordinary valve may be employed upon one single fitting or supply pipe.

The invention is not confined to the exact form of automatic hydrant described so long as the single combination permits of the automatic supply of water for hydrant purposes and a constant supply for any usual purpose without necessitating more than one fitting or supply pipe.

Having thus described my invention what I claim as new and desire to secure by Letters Patent is:—

In combination a bib-cock, an auxiliary branch thereon, a valve in said branch, a lever for engaging the end of the valve spindle, a link for retaining the lever in a down position, a loop adapted to connect a hose to said link, a stationary jaw, a movable jaw adapted to hold the hose nozzle, a spring attached to an extension of the movable jaw, and a locking bar directly connected to the movable jaw.

In testimony whereof I affix my signature in presence of two witnesses.

WILLIAM HENRY FEATHERSTONE.

Witnesses:
 CHAS. POLDEN,
 H. D. JAMESON.